(12) United States Patent
Lee et al.

(10) Patent No.: US 7,617,590 B2
(45) Date of Patent: Nov. 17, 2009

(54) METHOD OF MANUFACTURING AN EMBEDDED INDUCTOR

(75) Inventors: Cheng-Hong Lee, Taoyuan Hsien (TW); Yu-Lin Hsueh, Taoyuan Hsien (TW); Yi-Hong Huang, Taoyuan Hsien (TW)

(73) Assignee: Delta Electronics, Inc., Taoyuan Hsien (TW)

(*) Notice: Subject to any disclaimer, the term of this patent is extended or adjusted under 35 U.S.C. 154(b) by 0 days.

(21) Appl. No.: 11/971,786

(22) Filed: Jan. 9, 2008

(65) Prior Publication Data
US 2008/0231401 A1 Sep. 25, 2008

(30) Foreign Application Priority Data
Mar. 23, 2007 (TW) .............................. 96110079 A

(51) Int. Cl.
*H01F 7/06* (2006.01)
(52) U.S. Cl. .......................... 29/606; 29/602.1; 29/604; 29/605; 228/175; 228/180.22; 228/219; 336/110; 336/175; 336/178; 336/184; 336/215; 363/17; 363/48; 363/58

(58) Field of Classification Search ................ 29/602.1, 29/604–607, 840; 336/110, 175, 178, 184, 336/214, 215, 234; 363/17, 48, 58; 228/175, 228/180.22, 219
See application file for complete search history.

(56) References Cited

U.S. PATENT DOCUMENTS

| | | | |
|---|---|---|---|
| 4,836,631 A * | 6/1989 | Shimazu et al. | 359/218 |
| 6,204,744 B1 | 3/2001 | Shafer et al. | |
| 6,311,387 B1 * | 11/2001 | Shikama et al. | 29/602.1 |
| 6,661,328 B2 | 12/2003 | Inoue et al. | |

* cited by examiner

*Primary Examiner*—Paul D Kim
(74) *Attorney, Agent, or Firm*—Birch, Stewart, Kolasch & Birch, LLP

(57) ABSTRACT

A manufacturing method of an embedded inductor includes the steps of providing a magnetic plastic material, disposing at least one coil into a mold, and injecting or pressing the magnetic plastic material into the mold to form a magnetic body encapsulating the coil. An embedded inductor includes at least one magnetic body encapsulating the coil by injecting molding or pressing molding.

16 Claims, 5 Drawing Sheets

METHOD OF MANUFACTURING AN EMBEDDED INDUCTOR

CROSS REFERENCE TO RELATED APPLICATIONS

This Non-provisional application claims priority under 35 U.S.C. §119(a) on Patent Application No(s). 096110079 filed in Taiwan, Republic of China on Mar. 23, 2007, the entire contents of which are hereby incorporated by reference.

BACKGROUND OF THE INVENTION

1. Field of Invention

The invention relates to an inductor and a manufacturing method thereof. In particular, the invention relates to an embedded inductor and the manufacturing method thereof.

2. Related Art

Technical progresses push electronic products toward the trend of miniaturization, low operating voltages and high operating currents. The basic and important elements such as the inductors are also requested to have lighter weight and smaller size in accordance with the miniaturization requirement.

As shown in FIG. 1, the conventional EI-type inductor 1 comprises an E-type iron core 10, a coil 11, and an I-type iron core 12 stacked in sequence. The two pins 11a and 11b of the coil 11 are correspondingly bent to two preformed recessions 12a and 12b of the I-type iron core 12, respectively.

However, since the inductor 1 consists of several independent components packaged together, there are many air gaps inside it. The air gaps will lower the operating efficiency of the element and are not suitable for the miniaturization of the element. To provide an inductor that has the characteristic of large currents, high frequencies and low magnetic loss, the embedded inductor is introduced. As shown in FIG. 2, U.S. Pat. No. 6,204,744 discloses a manufacturing method of an embedded inductor including the following steps 81 to 89. In step 81, one end of a coil is soldered to a corresponding pin frame. In step 82, the coil is wound. In step 83, the other end of the coil is soldered onto the pin frame. In step 84, the acetone solution is added. In step 85, the coil is fixed. In step 86, magnetic powders are formed by mixing first iron powders 861, second iron powders 862, a filler agent 863, a resin 864 and a lubricant 865. In step 87, a mold is provided to perform a die casting process with the magnetic powders. In step 88, the resin is cured by heating. In step 89, the pins are cut and bent.

U.S. Pat. No. 6,661,328 discloses another manufacturing method of an embedded inductor (not shown). The method includes the following steps. First, a mixture containing metal magnetic powders and resin is provided. The mixture is heated at a temperature between 65° C. and 200° C. Then, the mixture is granulated. The mixture is then die-casted to form a magnetic body that covers a coil. Finally, the magnetic body is heated to cure the resin.

The related art employs the die casting and thermal curing method on magnetic powders to form the embedded inductor. However, this technique is not only slow in production, but it also cannot meet the miniaturization requirement due to some technical problems. Therefore, these methods are not ideal for manufacturing compact inductors.

Therefore, it is an important subject to provide an embedded inductor, which has high operating efficiency and low magnetic loss, and can meet the miniaturization and high production rate requirements, and a manufacturing method thereof.

SUMMARY OF THE INVENTION

In view of the foregoing, the invention is to provide an embedded inductor that has high operating efficiency and low magnetic loss, as well as meets the miniaturization and high production rate requirements. A corresponding manufacturing method of the embedded inductor is also disclosed.

To achieve the above, the invention discloses a manufacturing method of an embedded inductor. The manufacturing method includes the steps of: providing at least one magnetic plastic material, providing at least one coil in a mold, and injecting or pressing the magnetic plastic material into the mold to form a magnetic body encapsulating the coil.

To achieve the above, the invention also discloses an embedded inductor including a coil and at least one magnetic body. The magnetic body encapsulates the coil by injection or press molding.

As mentioned above, the embedded inductor and the manufacturing method thereof of the invention inject or press a magnetic plastic material into a mold to encapsulate the coil disposed and positioned inside the mold, thereby forming a magnetic body. Therefore, by using the injection or press molding technique, the invention can simply manufacture miniaturized embedded inductors. With an appropriate mold design, the embedded inductors can be mass produced at a relatively short time.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
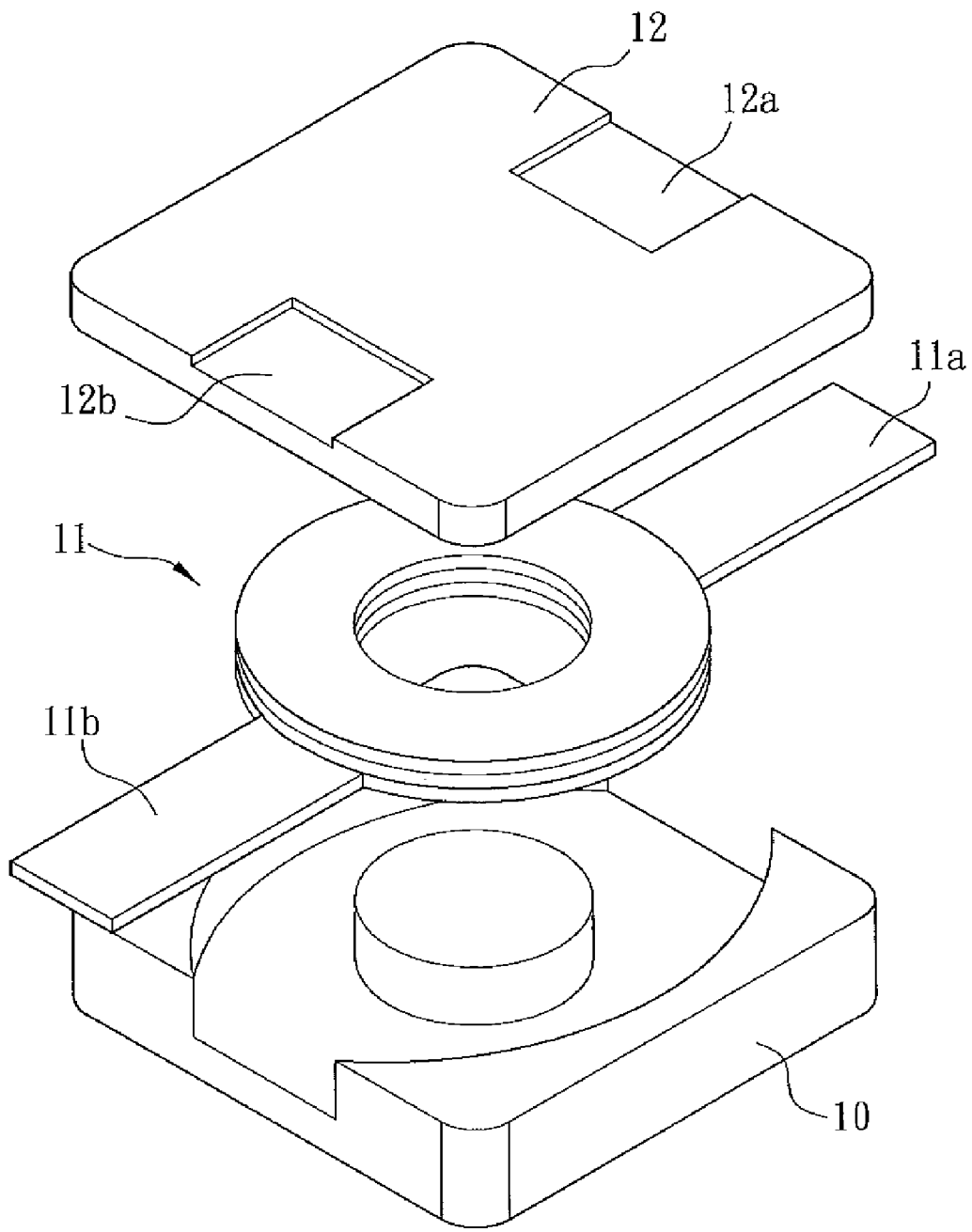
FIG. 1 is a schematic illustration of a conventional inductor.
Figure 2:
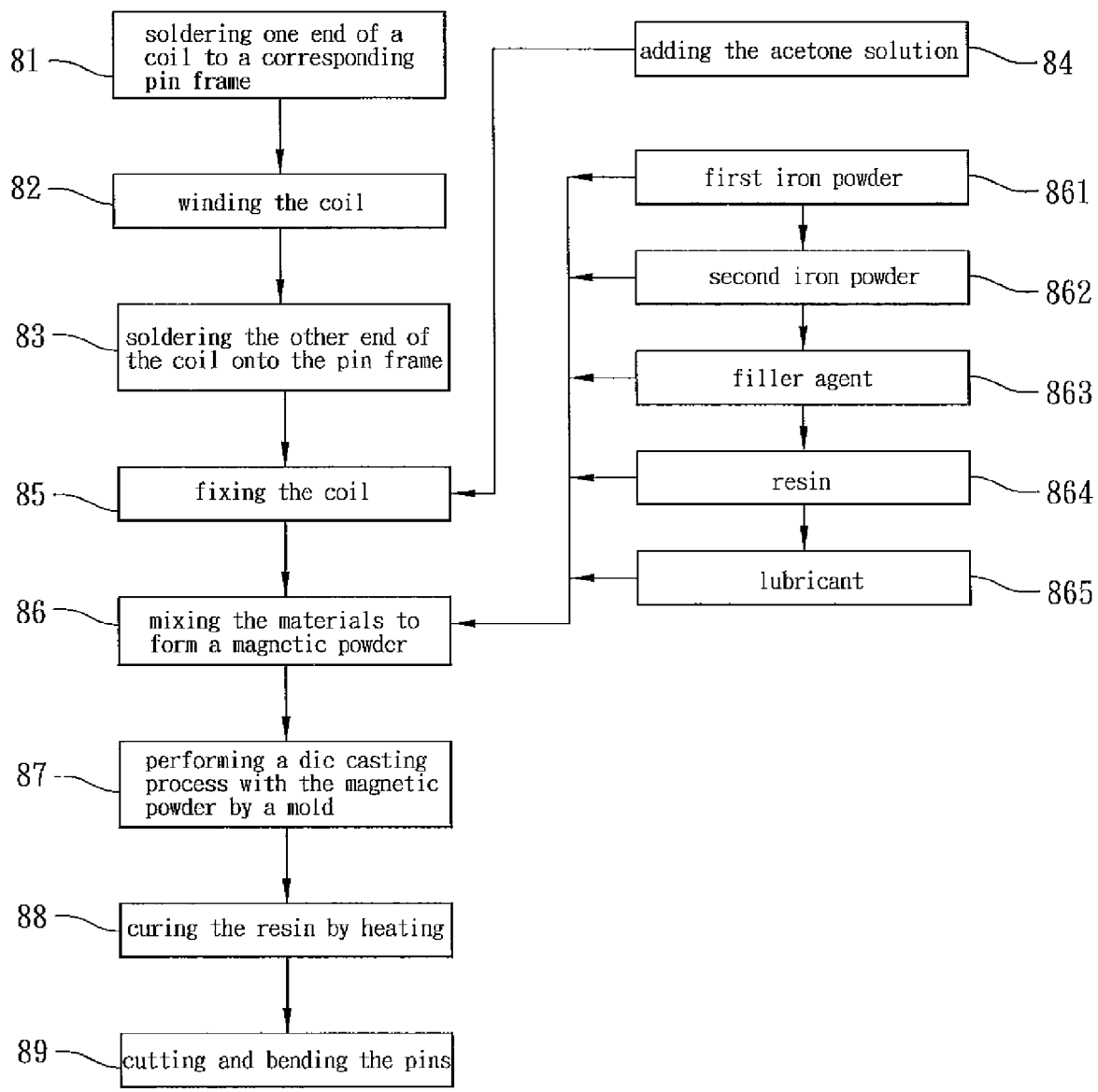
FIG. 2 is a flow diagram of a conventional manufacturing method of the embedded inductor.
Figure 3:
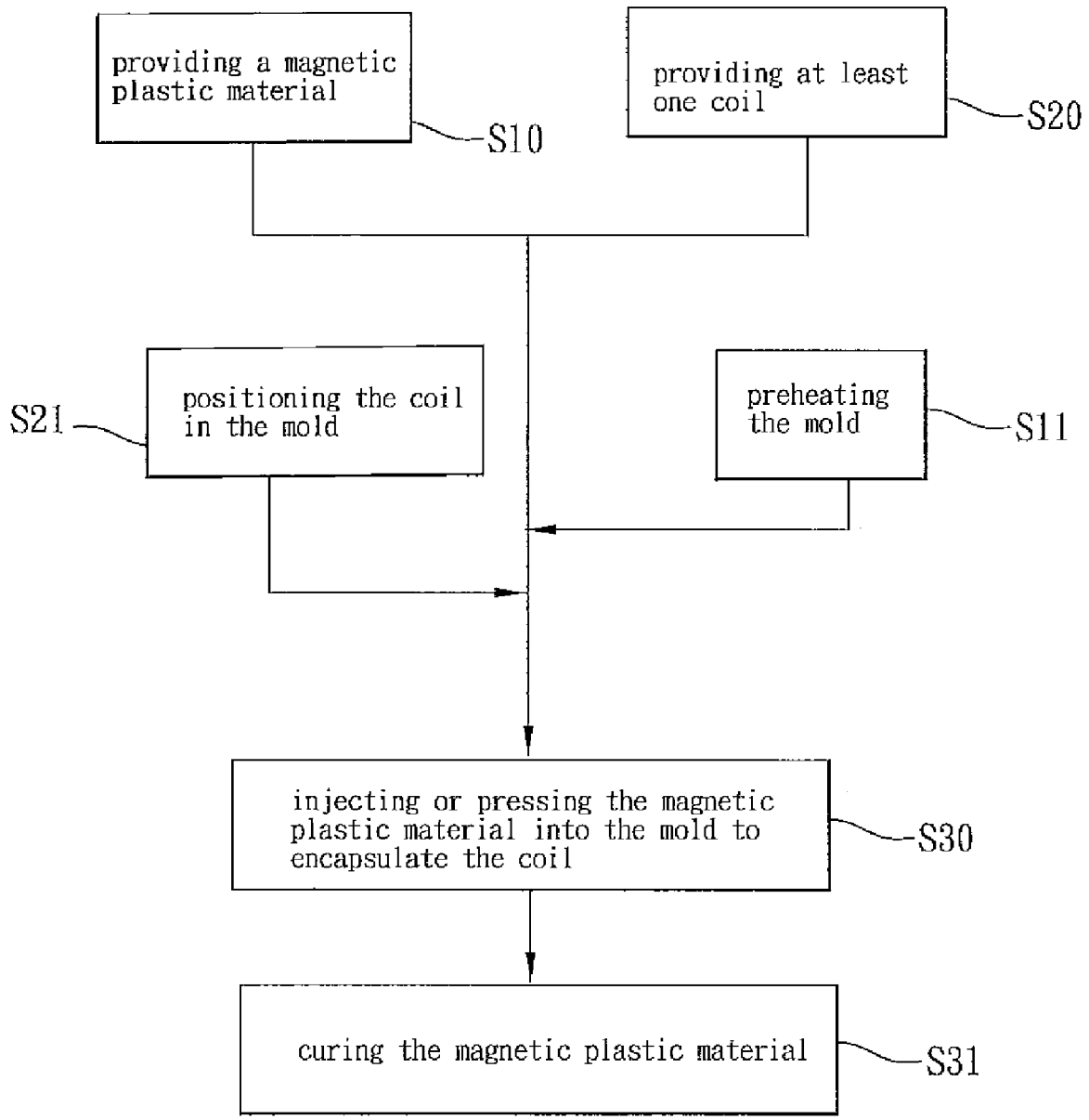
FIG. 3 is a flow diagram of a manufacturing method of an embedded inductor according to an embodiment of the invention.
Figure 4:
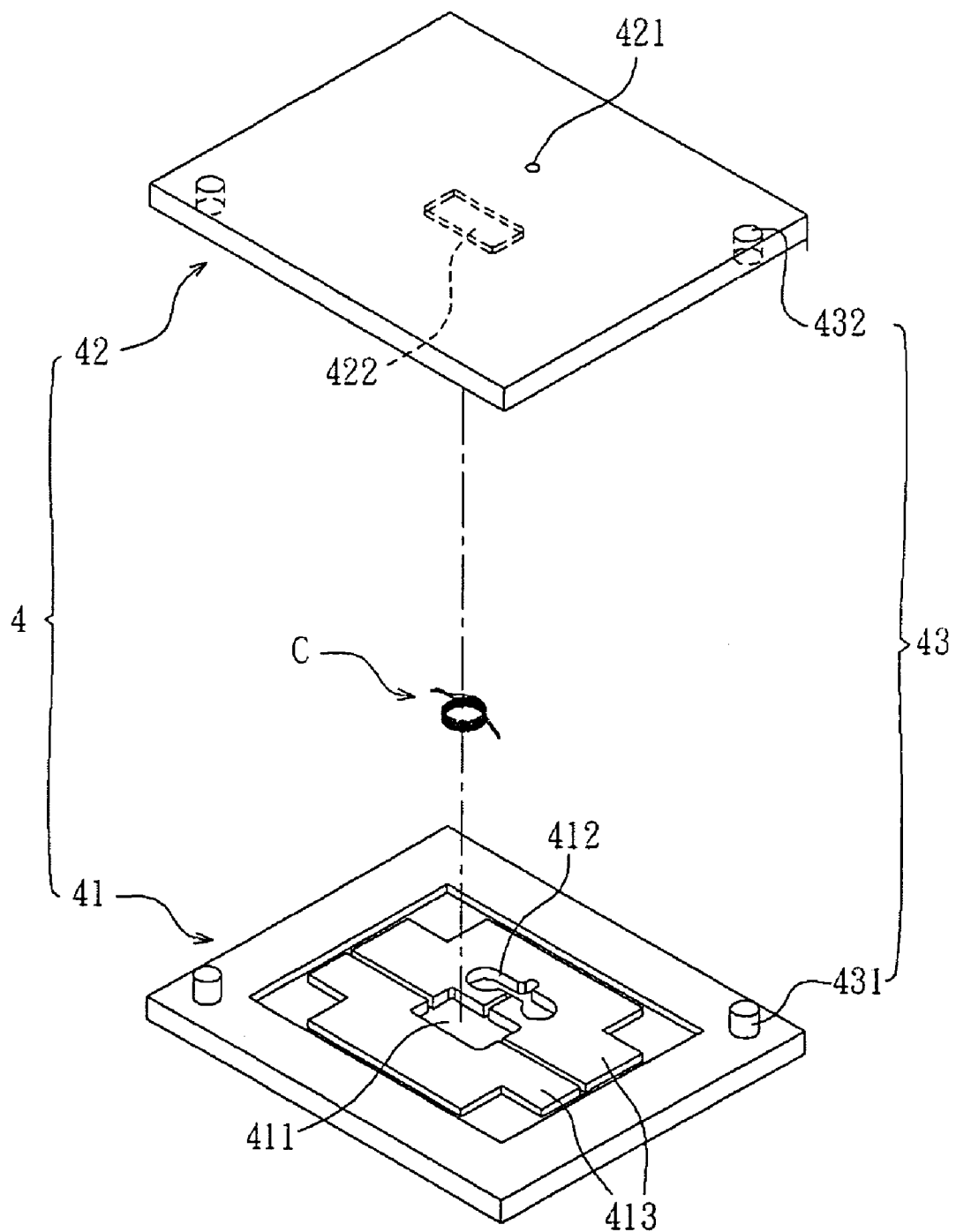
FIG. 4 is an exploded view of an embedded inductor according to the embodiment of the invention.
Figure 5:
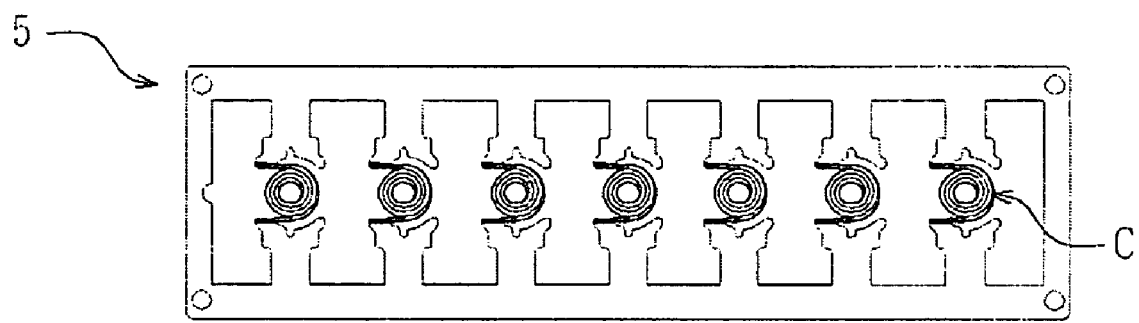
FIG. 5 is a top plan view of the frame and coil.

With reference to FIGS. 3 and 4, a manufacturing method of an embedded inductor according to an embodiment of the invention includes step S10, step S20 and step S30. In step S10, a magnetic plastic material is provided. In step S20, at least one coil C is provided. In step S30, the magnetic plastic material is injected or pressed into a mold 4 so that the magnetic plastic material encapsulates the coil C.

In step S10, the magnetic plastic material is a uniform mixture of at least one type of magnetic powders and a resin with adding a small amount of coupling agent. The magnetic powder in this embodiment is iron (Fe), silicon (Si), cobalt (Co), nickel (Ni), aluminum (Al), molybdenum (Mo) or their mixtures. The resin can be a thermosetting resin, thermoplastic resin, or photosetting resin. Moreover, the thermoplastic resin can be polypropylene, polyphenylene sulfide (PPS) or Nylon. Moreover, Nylon can be Nylon 6, Nylon 12, or Nylon 66. The thermosetting resin can be epoxy or phenol.

In step S20, the coil C is formed by winding a conductive wire several times. The conductive wire can be a round wire, square wire or flat wire. The coil C can have several ends, each of which can be directly used as a pin of the coil C. Alternatively, the end of the coil C may be externally connected with at least one conductive structure as the pin of the coil C. When an end of the coil C is directly used as a pin, the coil end or conductive structure preferably extends and protrudes from the magnetic body.

In step S30, the mold 4 consists of at least two mold units 41 and 42. The mold unit 41 includes at least an accommodating recess 411 and at least one flow channel 412 connected with the accommodating recess 411. The coil C is disposed inside the accommodating recess 411. The mold unit 41 or the mold unit 42 includes at least one hole 421 corresponding to the flow channel so that the magnetic plastic material can be injected.

Moreover, the mold unit 42 also has a concave part 422 corresponding to the accommodating recess 411. The combination of the accommodating recess 411 and the concave part 422 forms an accommodating space. Therefore, the magnetic plastic material can enter the accommodating space via the flow channel 412 to encapsulate the coil C.

Furthermore, the mold units 41 and 42 can be positioned via a positioning structure 43. The positioning structure 43 can be a pair of positioning pin 431 and positioning hole 432, corresponding to the mold units 41 and 42, respectively. Thus, the mold units 41, 42 can be readily positioned.

Before step S30, there can be an additional step S11 of preheating the mold 4 so that the magnetic plastic material can be easily filled into the mold 4. If the magnetic plastic material is a thermosetting resin, the preheating temperature of the mold 4 is preferably between the curing temperature and the plasticizing temperature. If the magnetic plastic material is a thermoplastic resin, the preheating temperature of the mold 4 is preferably higher than the plasticizing temperature.

Before step S30, there can also be an additional step S21 of positioning the coil C in the mold 4. The coil C is positioned inside the mold 4 using a first positioning structure 413. Step S21 can be performed while the coil C is disposed in the mold 4. Step 21 can also be performed after the mold 4 is assembled.

After step S30, there can be an additional step S31 of curing the magnetic plastic material to render a magnetic body. The embedded inductor is obtained after removing the mold 4. The method of curing the magnetic plastic material depends on the used material. It can be cooling (while the magnetic plastic material contains, for example, thermoplastic resin), heating (while the magnetic plastic material contains, for example, thermosetting resin) or illuminating with light (while the magnetic plastic material contains, for example, photosetting resin).

After step S31, there can further be a cutting step to cut the magnetic body, the coil ends or the conductive structure so that the embedded inductor has a better and smoother shape. Moreover, a bending action can be performed so that the pins of the coil C bend toward a particular direction. In this case, the embedded inductor can be more easily connected with the system or other devices.

To manufacture several embedded inductors at the same time, one can put multiple coils on at least one frame 5. At the same time, the mold is also provided with the same number of accommodating recesses corresponding to the coils to accommodate them. Therefore, a plurality of embedded inductors can be formed on the frame 5 at the same time. Afterwards, the embedded inductors are departed from the frame 5 by cutting.

Another method of manufacturing multiple embedded inductors is to form a plurality of accommodating recesses on the mold, followed by disposing a coil in each of the accommodating recesses. The coils can be disposed in an array when the number of coils is equal to or greater than 2. This method can also form multiple embedded inductors simultaneously.

In summary, the embedded inductor and the manufacturing method thereof of the invention inject or press a magnetic plastic material into a mold to encapsulate the coil disposed and positioned inside the mold, thereby forming a magnetic body. Therefore, by using the injection or press molding technique, the invention can simply manufacture miniaturized embedded inductors. With an appropriate mold design, the embedded inductors can be mass produced at a relatively short time.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A manufacturing method of an embedded inductor, comprising steps of:
   providing at least one magnetic plastic material;
   providing at least one coil; and
   injecting or pressing the magnetic plastic material into a mold to form a magnetic body encapsulating the at least one coil;
   wherein the mold comprises at least one first mold and at least one second mold, and the at least one first mold comprising at least one accommodating recess and at least one flow channel communicating with the accommodating recess and the at least one second mold comprising at least one hole corresponding to with the flow channel, and the at least one coil is disposed in the accommodating recess.

2. The manufacturing method of claim 1, wherein before the step of injecting or pressing the magnetic plastic material into the mold, the manufacturing method further comprises a step of preheating the mold.

3. The manufacturing method of claim 1, wherein before the step of injecting or pressing the magnetic plastic material into the mold, the manufacturing method further comprises a step of positioning the at least one coil and the mold.

4. The manufacturing method of claim 3, wherein the at least one coil and the mold are positioned with respect to each other via a first positioning structure.

5. The manufacturing method of claim 1, wherein after the step of injecting or pressing the magnetic plastic material into the mold, the manufacturing method further comprises a step of curing the magnetic plastic material to form the magnetic body.

6. The manufacturing method of claim 5, wherein when the magnetic plastic material is a thermoplastic resin, the magnetic plastic material is cured by cooling, when the magnetic plastic material is a thermosetting resin, the magnetic plastic material is cured by heating, or when the magnetic plastic material is a photosetting resin, the magnetic plastic material is cured by illuminating with light.

7. The manufacturing method of claim 1, wherein the at least one coil is connected to at least one frame.

8. The manufacturing method of claim 1, wherein the step of providing at least one coil includes providing a plurality of coils, and the coils are disposed in an array when the number of coils is equal to or greater than 2.

9. The manufacturing method of claim 1, wherein at least one end of the at least one coil is directly used as a pin or connected with at least one conductive structure, and wherein the at least one end of the at least one coil or the at least one conductive structure extends and protrudes from the magnetic body.

10. The manufacturing method of claim 9, wherein after the step of injecting or pressing the magnetic plastic material into the mold, the manufacturing method further comprises a step of cutting the magnetic body, the at least one end of the at least one coil or the at least one conductive structure.

11. The manufacturing method of claim 9 further comprising a step of bending the pin of the at least one coil.

12. The manufacturing method of claim 1 further comprising a step of mixing at least one type of magnetic powder in at least one resin to form the magnetic plastic material.

13. The manufacturing method of claim 1, wherein the mold, comprises:

the at least one first mold unit having the accommodating recess; and the at least one second mold unit having at least one concave part, wherein the concave part and the accommodating recess combine to form an accommodating space for accommodating the at least one coil.

14. The manufacturing method of claim 13, wherein the at least one first mold and the at least one second mold are positioned with respect to each other by using at least one positioning structure.

15. The manufacturing method of claim 1, wherein the step of providing at least one coil includes providing a plurality of coils, and the number of the at least one accommodating recess is equal to the number of the coils when the number of the coils is equal to or more than 2, and each of the coils is disposed in the corresponding accommodating recess.

16. The manufacturing method of claim 1, wherein the at least one coil is formed on at least one frame before the at least one coil is disposed in the accommodating recess.

* * * * *